Figure 1:
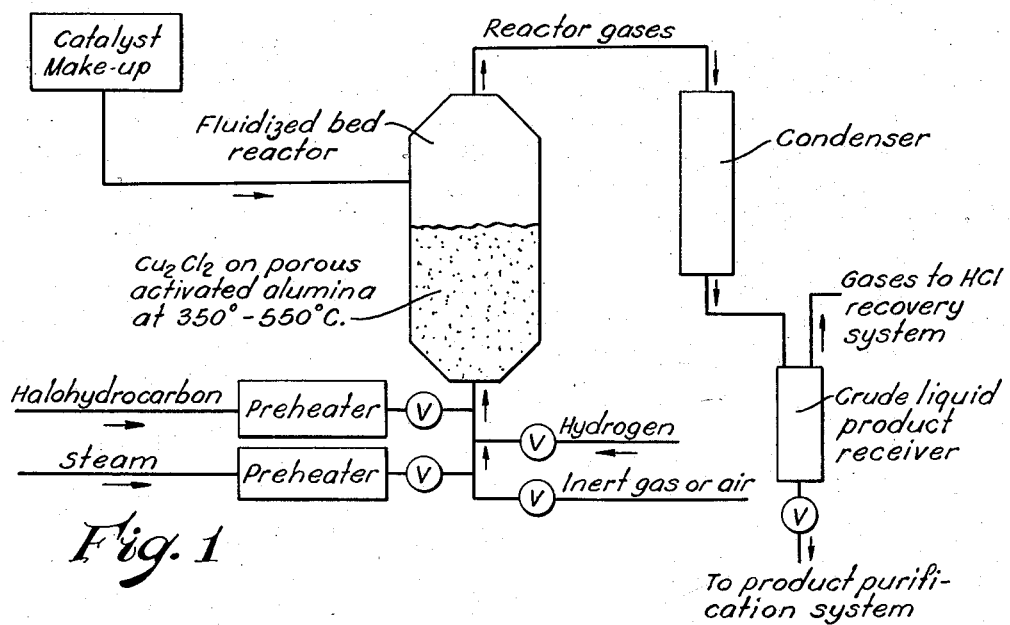

INVENTORS
Holmes H. McClure
James S. Melbert
Louis D. Hoblit

United States Patent Office 2,886,605
Patented May 12, 1959

2,886,605

METHOD OF REDUCING THE HALOGEN CONTENT OF HALOHYDROCARBONS

Holmes H. McClure, James S. Melbert, and Louis D. Hoblit, Lake Jackson, Tex., assignors to The Dow Chemical Company, Midland, Mich., a corporation of Delaware Application October 11, 1954, Serial No. 461,376

10 Claims. (Cl. 260—650)

This invention relates to an improved procedure for reducing the chlorine or bromine content of halohydrocarbons containing one or both of these halogens. Thus, it relates to a method for converting polyhalogenated hydrocarbons to halohydrocarbons of lower halogen content and to a method for converting monohalohydrocarbons to hydrocarbons.

Numerous attempts have been made to reduce halogenated compounds according to the generalized equation:

$$RX_n + (n-m)H_2 \rightarrow R'H_{(n-m)}X_m + (n-m)HX$$

wherein X is chlorine or bromine, $n$ is an integer, $m$ is a smaller integer, and R and R' are organic radicals, any difference being in their hydrogen content, containing only carbon and either hydrogen or halogen, or both hydrogen and halogen. Some of the prior procedures have been successful on a laboratory scale, in batch runs of small size. Most of the reported reactions dealing with halohydrocarbon reduction have been carried out using such conventional hydrogenation catalysts as nickel, platinum or palladium which are rapidly poisoned by halogens. The yields have not been high and the methods described have not generally been adaptable to commercial and continuous operations. Typical reports of prior experimentation in this field, though not concerned exclusively with halohydrocarbon reduction, are to be found in the following publications:

Berichte der deutschen chemischen Gesellschaft 48, 452–8 (1915); 49, 55 (1916); 49, 1063–9 (1916); 50, 305–10 (1917); 62B, 2612–20 (1929).

Bulletin de la Societe chimiques de France [4] 7, 270 (1910); [4] 41, 1253–90 (1927).

Comptes rendus des Seances de l'Academie des Sciences 206, 1387–9 (1938).

Journal of the American Chemical Society 65, 270–2 (1943).

Izvestiya Akademii Nauk SSSR 4, 439–46 (1946).

The last identified publication discloses that chlorinated or brominated aromatic hydrocarbons, such as benzene or naphthalene, may be treated with steam or with hydrogen at 400° to 500° C. over titanium oxide or tin oxide catalysts impregnated with copper chloride as a promoter. Under the reported conditions, titanium oxide alone, tin oxide alone and copper chloride alone were each substantially ineffective in catalyzing the desired halogen reduction reaction. The mixtures of titanium or of tin oxides and copper chloride were effective. The copper was gradually carried out of the reaction vessel, the catalytic oxide gradually became fouled with carbon, and the catalyst became inactive. As a possible commercial process for reducing halohydrocarbons, the method disclosed by Freidlin et al. in the Russian journal leaves much to be desired. The same publication shows that, when such other oxides as silica gel are burdened with copper salts for use in the reaction, phenols are obtained rather than hydrocarbons of reduced halogen content.

A more efficient dehalogenation process is described by Arnold et al. in U. S. Patent No. 2,025,032, using as catalyst a sulfide of chromium, molybdenum, tungsten or uranium, but that method requires high pressures of the order of 200 atmospheres for best results with many halohydrocarbon feeds.

It is among the objects of the present invention to provide a commercially practical process, capable of continuous operation, for the recovery in good yields of hydrocarbons or lower halogenated hydrocarbons from chlorinated or brominated hydrocarbons of the alkane, alkylene, cycloalkane, benzene and naphthalene series. A related object is to provide such a process in which the halogen content of the feed material is reduced by the action of steam or of hydrogen over a rugged catalyst which has long life in the process. Another object is to provide such a process in which carbon formation due to thermal decomposition according to the general reaction

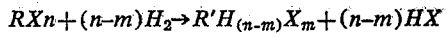

wherein $n$ and $v$ are positive integers and $m$ is zero or a positive integer, may be suppressed and the amount of carbon so-formed may be stripped from the catalyst. Other and related objects may appear hereinafter.

It should be pointed out that the present invention is concerned with reactions in which the amount of halogen in the feed material is reduced without altering the basic structure of the hydrocarbon radical, such as:

$$(C=C-C=C)Cl_6 + H-(C=C-C=C)Cl_5$$

or $$C_6H_5Cl \rightarrow C_6H_6$$

It is also concerned with reaction in which a polyhalogenated feed material first undergoes a loss of hydrogen halide, to form an unsaturated halogenated compound, and the latter is thereupon caused to lose more halogen without further change in its degree of unsaturation. Examples of such reactions are:

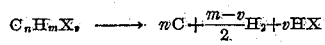

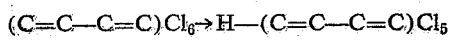

and

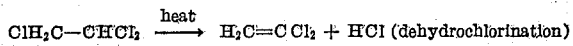
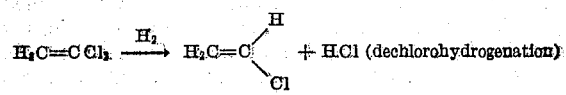

Reactions of this type are especially useful in converting undesired polyhalogenated materials, often obtained as by-products, into commercially useful lower halogenated compounds. Such reactions may be referred to as dehalohydrogenation reactions.

The foregoing and related objects are accomplished, according to the present invention, by a process to be described more fully, the essential features of which are the exposure of a chloro- or bromohydrocarbon to the action of hydrogen, at a reaction temperature of 350°–550° C., in a fluidized bed of a catalyst consisting essentially of cuprous halide impregnated on porous active alumina. Provision is made to free the catalyst from accumulated tars and carbon either continuously or periodically.

The hydrogen for use in the process is supplied preferably from an outside source, but may be generated in the reaction zone, with some loss of feed material, by means of the watergas reaction or by thermal cracking of some of the feed material. Thus, when steam and monochlorobenzene are heated together to 500° C. over the cuprous chloride on alumina catalyst, part of the chlorobenzene is decomposed, and part is dechlorohydrogenated:

$$C_6H_5Cl + 6H_2O \rightarrow 6CO + HCl + 8H_2$$

$$8C_6H_5Cl + 8H_2 \rightarrow 8HCl + 8C_6H_6$$

The net reaction is:

$$9C_6H_5Cl + 6H_2O \rightarrow 6CO + 9HCl + 8C_6H_6$$

Hence, while the reaction can be effected using steam, it is more economical of organic values and simplifies the recovery of products to use gaseous hydrogen and to omit steam completely or to use it only in the limited amount which will remove carbonized deposits from the catalyst, thus:

$$C_6H_5Cl \rightarrow 6C + 2H_2 + HCl$$

$$6C + 6H_2O \rightarrow 6CO + 6H_2$$

The difference between the procedure in which the halohydrocarbon is dehalohydrogenated using steam and that in which the carbonized residue of a halohydrocarbon is removed by the watergas reaction is economically important. When steam is relied on for hydrogen, as in the first case, one-ninth of the chlorobenzene of the example must be destroyed to provide hydrogen for the other eight-ninths. When, however, only enough steam is admitted to convert carbon to carbon monoxide, there is little loss of organic values since generally much less than 5 percent of a halohydrocarbon feed will undergo carbonization in the process.

The reaction of dehalohydrogenation is exothermic, and it has been found that it is more difficult to control the reaction and to obtain commercially satisfactory results in a fixed bed reactor or in a moving bed reactor, than when using a fluid bed, even when using the improved catalyst mass of the present invention, because of the development of hot spots and resultant excessive deposition of carbon such as occurred in the process of the Russian publication discussed above. It is possible to use the present catalyst, however, in fixed or moving beds more satisfactorily than any prior suggested catalyst. Instantaneous uniformity of temperature in the reaction zone is an inherent attribute of fluidized bed reaction zones, and, in the present process, a fluid bed reactor gives the most successful operation.

The catalyst system must be one which is not poisoned by halogen compounds, and, for preferred operations it must be in a form capable of being fluidized by the passage of gases or vapors therethrough, suitably those of the reagents. The catalyst must also have large surface area per unit mass or volume and must be hard enough so as not to crumble on contact with other like particles or with the vessel walls but not so hard as to be excessively abrasive. The desired combination of properties is found in a mass of surprising catalytic activity and durability formed by impregnating graded particles of active alumina with a chloride of copper in amount to represent from 2 to 25 and preferably from 5 to 20 percent by weight of cuprous chloride, based on the weight of alumina. For convenience, because of its greater solubility, cupric chloride solution is used to impregnate the alumina, and, after the mass is dried, is reduced to cuprous chloride during the early stages of the reaction, thus:

$$C_6H_4Cl_2 + 2CuCl_2 \rightarrow C_6H_3Cl_3 + Cu_2Cl_2 + HCl$$

or by exposing it briefly at reaction temperature to a relatively inexpensive hydrocarbon gas such as methane:

$$CH_4 + 2CuCl_2 \rightarrow CH_3Cl + Cu_2Cl_2 + HCl$$

The porous active alumina employed may be any of the grades of partially hydrated predominantly gamma alumina which are prepared commercially by calcining a rock-like alumina trihydrate derived from bauxite. Non-porous native or fused aluminas are unsatisfactory. Examples of suitable grades of commercial active alumina are Alcoa Grades F-1, F-10 and XF-21. These may be in the form of crushed and sieve-graded particles or they may be in the commercially available microspherical bead form. The catalyst mass has been found to be most effective when it is substantially free from sodium, potassium and sulfur compounds.

The annexed drawings are diagrammatic representations of various assemblies of apparatus for carrying out the process of the invention.

Specific and illustrative examples of reactions which may be carried out according to the present invention include:

| The Conversion of— | To— |
|---|---|
| Carbon tetrachloride | Chloroform. |
| Chloroform | Methylene chloride. |
| Methylene chloride | Methyl chloride. |
| Methyl chloride | Methane. |
| 1,1,2-Trichloroethane (via vinylidene chloride) | Vinyl chloride. |
| Perchloroethylene | Trichloroethylene. |
| Hexachlorobutadiene | Pentachlorobutadiene. |
| Pentachlorobutadiene | Tetrachlorobutadiene. |
| Hexachlorocyclohexane (via trichlorobenzene) | Dichlorobenzenes. |
| Benzotrichloride | Benzal chloride. |
| Benzal chloride | Benzyl chloride. |
| Benzyl chloride | Toluene. |
| Hexachlorobenzene | Penta and lower chlorobenzenes. |
| Tetrachlorobenzene | Tri and lower chlorobenzenes. |
| Trichlorobenzenes | Dichlorobenzenes (mostly meta). |
| Dichlorobenzenes | Monochlorobenzene. |
| Monochlorobenzene | Benzene. |
| Chloronaphthalenes | Lower chloronaphthalenes and naphthalene. |

The corresponding bromohydrocarbons are dehalohydrogenated in the same manner, but at somewhat lower rates of conversion. Whenever the feed material is a polyhalogenated compound, the product is a mixture which usually contains each of the several possible lower halogenated compounds and some of the hydrocarbon. The dichloro product obtained when dehalohydrogenating any of the trichlorobenzenes, surprisingly, is composed largely of meta-dichlorobenzene. The reactions are:

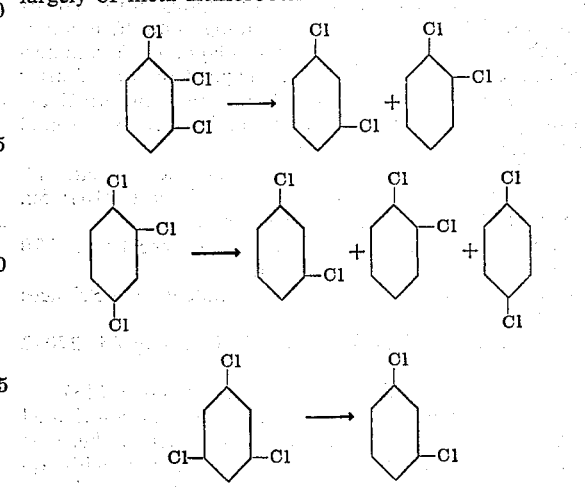

There has been no commercially practical prior method for making meta-dichlorobenzene, and the present invention makes possible its preparation by simple chlorination and dechlorohydrogenation reactions. Feed materials from which meta-dichlorobenzene may be made include the tri-, tetra-, penta- and hexachlorobenzenes, many of which are obtained as unwanted by-products in benzene chlorination reactions, and benzene hexachloride (hexachlorocyclohexane), only two of the several isomeric forms of which have any known utility.

In carrying out the process using a simple fluidized bed reactor system as illustrated in Fig. 1, the copper-burdened activated alumina is charged to the reactor, preferably with the compound in the form of a cuprous halide. The catalyst body is fluidized and brought to reaction temperature by passing preheated and preferably inert gases therethrough. Thus, hot nitrogen may be used, though a mixture of hydrogen or steam and a halohydrocarbon may also be used in proportions to prevent reduction of the cuprous ions to metallic copper. When the bed is heated and fluidized, other gases are shut off as the intended reagents (hydrogen or steam and halohydrocarbon) are admitted at a rate to maintain turbulence in the catalyst bed and in proportions to give the principal desired reaction. It is undesirable to use more hydrogen in any case than could theoretically reduce the halohydrocarbon feed to hydrocarbon, as the excess hydrogen reduces the cuprous halide to metallic copper, and the reaction slows and comes to a stop. If the bed tends to become too hot, due to the exothermic reaction, some cold inert gas is supplied to maintain the fluid condition and to aid in carrying away excess heat. The effluent gases pass overhead to a product recovery system in which the gases are cooled to separate condensible matter and the non-condensibles are treated to recover hydrogen halide. The condensed crude mixture of hydrocarbon and halohydrocarbon products is usually subjected to fractional distillation to recover the individual constituents. Catalyst make-up may be effected at any time, to replace that which may be carried out in the reactor gas stream. When the catalyst activity diminishes, due to carbon accumulation, the carbon may be oxidized and the activity restored by decreasing or stopping the halohydrocarbon feed temporarily while admitting steam or air to the reaction zone.

Figure 2:
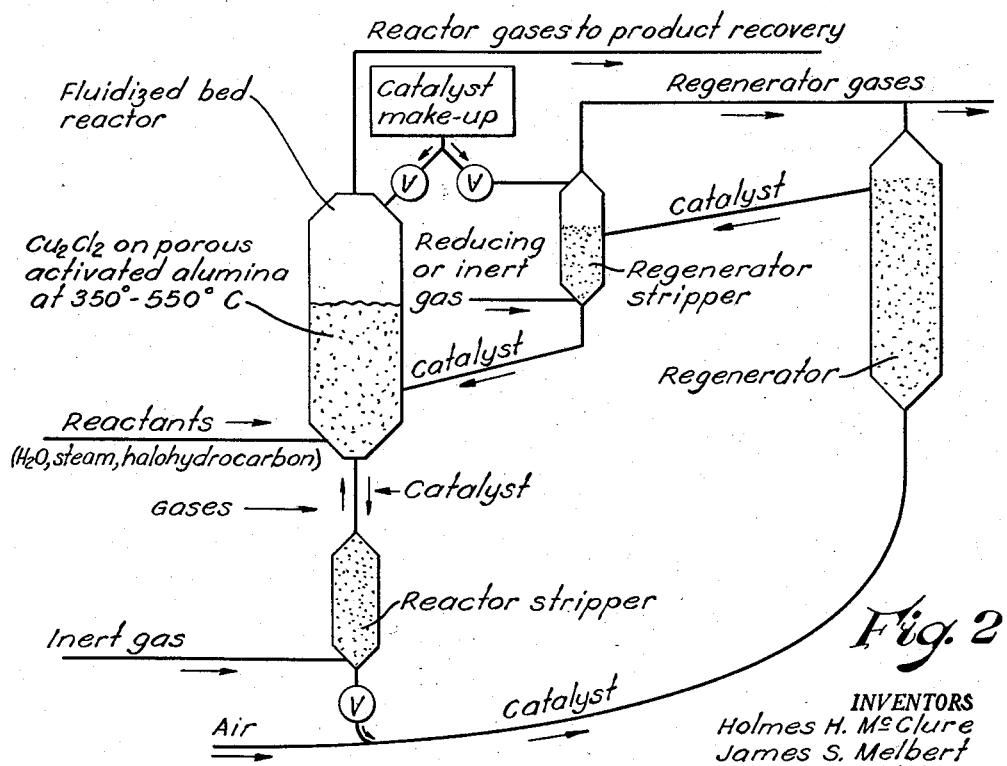
Figure 3:
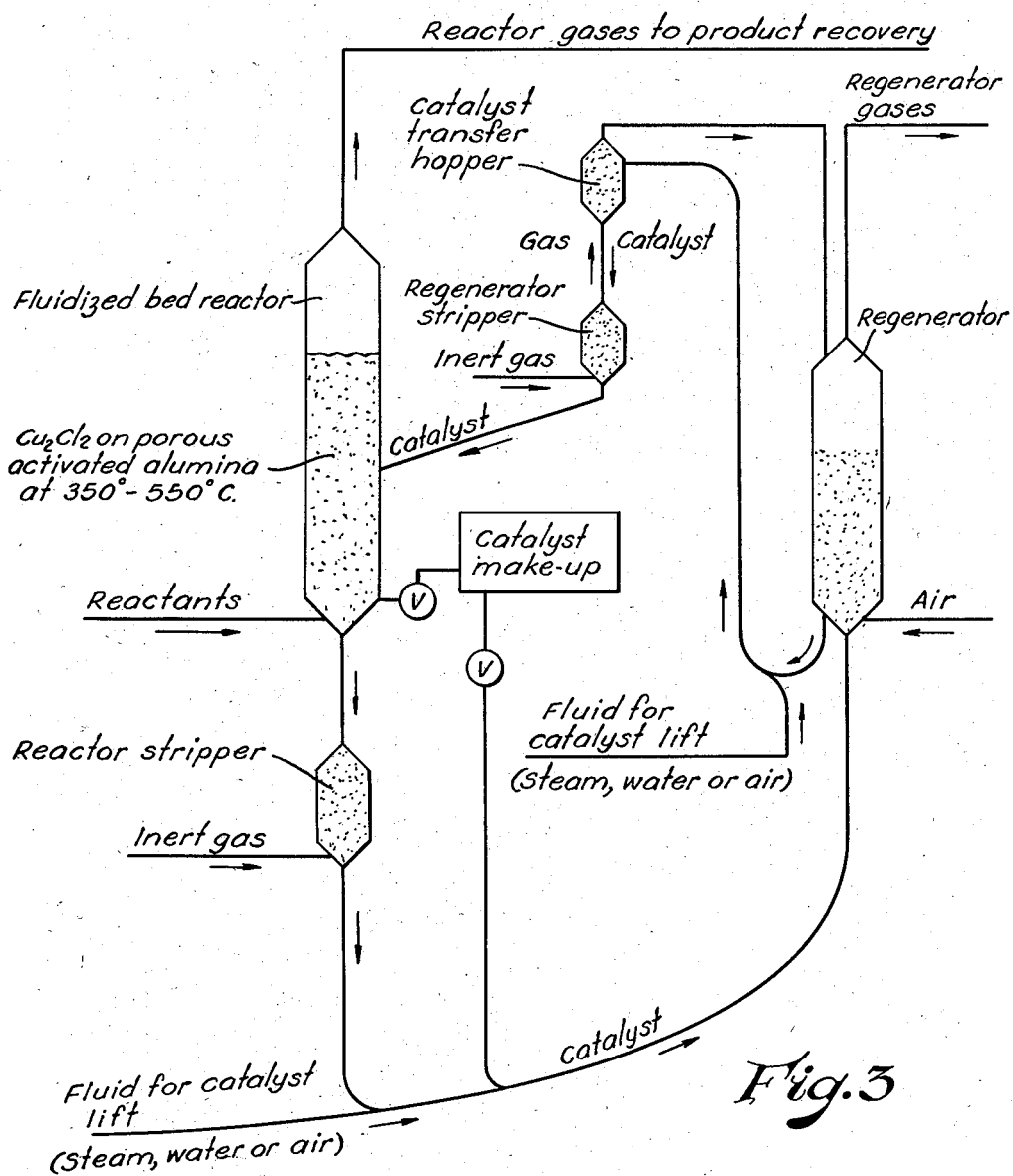

The process may be carried out somewhat more conveniently in the apparatus illustrated in Figs. 2 and 3. In that shown in Fig. 2, part of the catalyst body falls, continuously or intermittently, as desired from the reactor into a reactor stripper in which the catalyst is freed from reagent vapors by a stream of inert gas which then rises into the reactor and assists in maintaining turbulence. The stripped catalyst passes downward from the stripper to an air lift and is transferred to a regenerator chamber maintained at a temperature near that in the reactor. The air used to lift the catalyst also serves to burn off carbon deposits, converting at least part of the copper values to cupric chloride, cupric oxychloride, cupric oxide, or mixtures thereof. The catalyst mixture passes from the regenerator to a regenerator stripper in which final traces of carbon oxides and air are removed by a stream of inert or reducing gas, and thence back to the reactor. Catalyst make-up is not as great as in the apparatus of Fig. 1, since carry-out losses are minimized, but such make-up as may be required can take place at any desired point, suitably in the reactor or in the regenerator stripper, or, as suggested in Fig. 3, in the catalyst lift to the regenerator.

The apparatus illustrated in Fig. 3 differs from that in Fig. 2 primarily in the presence of a second fluid lift to transfer the catalyst mass from the regenerator to a catalyst hopper. The catalyst falls from the hopper into the regenerator stripper, and the stripping gas is returned to the regenerator before passing out of the system.

In the operation of the systems of Figs. 2 and 3, the fluid used to lift and transfer the catalyst from one chamber to a higher chamber may be air or steam. Steam may be introduced as such or as liquid water which forms steam on contact with the hot catalyst particles.

The following specific examples illustrate the practice of the invention.

*Example 1*

1,1,2-trichloroethane vapor and about an equimolar amount of steam were fed to the bottom of a fluidized bed reactor containing a catalyst mass composed of active alumina (Grade F-1, particle size 40-100 mesh, U.S. sieve series) impregnated with 15 percent by weight of cupric chloride which had been reduced to cuprous chloride by contact with gaseous ethylene at 480° C. The fluidizing effect was produced by the feed mixture, and reaction proceeded rapidly at 450° C., with copious evolution of hydrogen chloride. The reactor gases were passed through brine-cooled condensers to refrigerated traps. The organic matter condensed in the recovery system was distilled and consisted of:

| Compound | Weight percent | Mol percent |
| --- | --- | --- |
| Vinyl chloride | 50.0 | 61.1 |
| Vinylidene chloride | 40.0 | 31.6 |
| Cis and trans dichloroethylene | 7.0 | 5.6 |
| Trichloroethane | 3.0 | 1.7 |
|  | 100.0 | 100.0 |

When the vinylidene chloride portion of the product is recirculated through the fluidized bed, over 60 percent of it is converted to vinyl chloride in each pass through the reactor. Overall yields of vinyl chloride thus obtained approach 90 percent. There is less than 5 percent oxidation loss in this reaction.

*Example 2*

Hexachlorobutadiene-1,3 and hydrogen were fed to a fluidized bed reactor containing the same catalyst mass as employed in Example 1. The bed was kept at about 500° C. and about 60 percent of the feed material was converted to pentachlorobutadiene in each pass through the reactor. There was about 5 percent oxidation loss. Because of the low volatility of the hexachlorobutadiene, it was extremely difficult to maintain a uniform rate of feed.

*Example 3*

Solid hexachlorobenzene (1 mol) was fed with an excess (about 4 mols) of hydrogen to a fluidized catalyst bed consisting initially of 20 percent by weight of cupric chloride (reduced to cuprous chloride) on finely divided Grade F-10 active alumina at a reaction temperature of about 550° C. About 60 percent of the hexachlorobenzene was converted, per pass through the reactor, to liquid products. These consisted of:

|  | Weight percent | Mol percent |
| --- | --- | --- |
| Benzene | 10 | 19.2 |
| Monochlorobenzene | 15 | 21.6 |
| Dichlorobenzenes | 19 | 19.4 |
| Trichlorobenzenes | 21 | 17.4 |
| Tetra- and pentachlorobenzenes | 35 | 22.4 |
|  | 100 | 100.0 |

Oxidation losses did not exceed 5 percent.

*Example 4*

Hexachlorocyclohexane and steam were passed through the fluidized catalyst of Example 3 at 510° C. There was substantially complete conversion to recoverable liquid products, with less than 2 percent loss due to oxidation. The products obtained were

|  | Weight percent | Mol percent |
| --- | --- | --- |
| Benzene | 21 | 30.3 |
| Monochlorobenzene | 40 | 39.9 |
| Dichlorobenzenes | 39 | 29.8 |
|  | 100 | 100.0 |

*Example 5*

Mixed trichlorobenzenes (1 mol) and an excess of hydrogen (3.3 mols) were passed together through the catalyst mass described in Example 1, and enough methane was added to the feed to fluidize the catalyst. Reaction was maintained at a temperature of 500° C. The benzene and chlorobenzenes were condensed from the effluent gases from the reactor, and were separated by fractional distillation.

| Compound | Weight percent | Mol percent |
|---|---|---|
| Benzene | 46.3 | 63.0 |
| Monochlorobenzene | 9.2 | 8.7 |
| Dichlorobenzenes | 16.7 | 12.1 |
| Trichlorobenzenes (unchanged) | 27.8 | 16.2 |
| | 100.0 | 100.0 |

*Example 6*

Grade F-1 active alumina was mixed with and absorbed a concentrated aqueous solution of cupric chloride containing 20 percent as much cupric chloride as the weight of alumina. The resulting impregnated product was dried by blowing fluidizing quantities of ethane therethrough at gradually increasing temperatures up to 450° C. The blue-green cupric chloride was thus reduced to white cuprous chloride. Hexachlorobenzene was melted in a vessel immersed in a fused salt bath at 275° C. and hydrogen was bubbled through the hexachlorobenzene at a rate of 30 to 32 gram mols per hour, carrying with it vapors of hexachlorobenzene at an estimated rate of about 4-5 gram moles per hour. The stream of hydrogen and hexachlorobenzene was used to fluidize the catalyst bed which was at a temperature from 470° to 500° C. The amount of hydrogen in the vent gas ranged from 3 to 5 gram mols per hours. In the course of one hour there was recovered 555 grams of liquid condensate, having a specific gravity of 1.28 at room temperature. On distillation, this was found to consist of the following compounds in the stated proportions:

| | Grams | Mols | Mol percent |
|---|---|---|---|
| Benzene | 92 | 1.18 | 29.0 |
| Monochlorobenzene | 80 | .71 | 17.4 |
| Dichlorobenzenes | 90 | .61 | 14.9 |
| Trichlorobenzenes | 287 | 1.58 | 38.7 |
| | 549 | 4.08 | 100.0 |

The dichlorobenzene fraction was analyzed by infrared absorption spectroscopy and was found to contain all three isomers in about the following relative proportions:

Orthodichlorobenzene _____ 24
Metadichlorobenzene _____ 50
Paradichlorobenzene _____ 26

It may be noted that, since hexachlorobenzene is often obtained as a by-product in the chlorination of methane and other aliphatic hydrocarbons, the present process is a practical way in which to form useful benzene products from natural gas or petroleum fractions.

Various other halohydrocarbons, in which the halogen is chlorine or bromine, all respond in about the same manner to the action of hydrogen over fluidized cuprous halide on activated alumina catalyst. The bromo-compounds are slightly more resistant to dehalohydrogenation than the chloro-compounds, i.e., the reaction rates are lower. It is not desirable to increase the reaction temperature to much above 550° C., however, in attempting to increase the reaction rates, as such temperatures accelerate the carbonization of the compounds disproportionately to the minor acceleration of the desired reaction.

In several of the runs reported in the examples it was observed that a gradual deposition of carbon occurred on the fluidized catalyst particles. This was removed by either of two procedures. The catalyst was exposed to a stream of air or of steam at a temperature from 450° to 550° C. after removing the catalyst temporarily from the line of flow of halogenated hydrocarbon.

In runs of long duration, and especially when a high rate of gas flow was employed, some of the cuprous chloride-alumina particles were carried away in the product stream. Such loss was offset by introducing into the system enough porous activated alumina to maintain the desired volume in the fluidized bed. The copper values lost by carryout of catalyst were replaced by introducing into the system cuprous chloride or any copper compound which, in the prevailing reducing atmosphere and in the presence of hydrogen halide, was convertible to cuprous chloride. Cupric oxide, cupric chloride and many other copper compounds behave in this way. Most generally, the copper makeup was accomplished by using an aqueous solution of cupric chloride in amount to provide from 5 to 25 percent of cuprous chloride in the newly added catalyst.

Certain of the process details disclosed but not claimed herein form the subject of a concurrently filed application of Noland Poffenberger et al., Serial No. 461,313, now abandoned.

We claim:

1. The method which comprises bringing the vapor of at least one member of the class consisting of the chloro- and bromohydrocarbons into intimate contact with gaseous hydrogen in a fluidized bed of a cuprous halide supported on porous active alumina, the amount of cuprous halide being from 2 to 25 percent of the weight of the alumina, at a temperature in the range from 350° to 550° C., and recovering the resulting dehalohydrogenation product.

2. The method claimed in claim 1, wherein the compound subjected to dehalohydrogenation is a polychlorohydrocarbon.

3. The method claimed in claim 1, wherein the compound subjected to dehalohydrogenation is a polychloroaliphatic hydrocarbon.

4. The method claimed in claim 1, wherein the compound subjected to dehalohydrogenation is trichloroethane.

5. The method claimed in claim 1, wherein the compound subjected to dehalohydrogenation is a polychlorocycloalkane.

6. The method claimed in claim 1, wherein the compound subjected to dehalohydrogenation is hexachlorocyclohexane.

7. The method claimed in claim 1, wherein the compound subjected to dehalohydrogenation is a polychloroaromatic hydrocarbon.

8. The method claimed in claim 1, wherein the compound subjected to dehalohydrogenation is a polychlorobenzene.

9. The method claimed in claim 1, wherein the compound subjected to dehalohydrogenation is hexachlorobenzene.

10. The method claimed in claim 1, wherein the compound subjected to dehalohydrogenation is a trichlorobenzene.

References Cited in the file of this patent

UNITED STATES PATENTS

| 2,025,032 | Arnold et al. | Dec. 24, 1935 |
| 2,118,001 | Andrews et al. | May 17, 1938 |
| 2,504,919 | Bordner | Apr. 18, 1950 |
| 2,726,271 | Troyan et al. | Dec. 6, 1955 |

OTHER REFERENCES

Friedlin et al.: "Izvestia Akademii Nauck S.S.S.R., Od. Khim.," 1946, No. 4, pp. 439–446.